(12) United States Patent
Wallace

(10) Patent No.: US 9,301,038 B2
(45) Date of Patent: Mar. 29, 2016

(54) AUDIO HEADSET

(71) Applicant: Bose Corporation, Framingham, MA (US)

(72) Inventor: Eric M. Wallace, Andover, MA (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 14/696,763

(22) Filed: Apr. 27, 2015

(65) Prior Publication Data

US 2015/0230015 A1 Aug. 13, 2015

Related U.S. Application Data

(62) Division of application No. 14/014,929, filed on Aug. 30, 2013, now Pat. No. 9,049,514.

(51) Int. Cl.
| | |
|---|---|
| *H04R 25/00* | (2006.01) |
| *H04R 1/10* | (2006.01) |
| *G02C 3/00* | (2006.01) |
| *G02C 5/14* | (2006.01) |
| *G02C 9/00* | (2006.01) |

(52) U.S. Cl.
CPC ............... *H04R 1/105* (2013.01); *G02C 3/003* (2013.01); *G02C 5/143* (2013.01); *G02C 9/00* (2013.01)

(58) Field of Classification Search
CPC .. H04R 1/105; H04R 5/0335; H04R 2201/10; G02C 5/143; G02C 3/003
See application file for complete search history.

(56) References Cited

U.S. PATENT DOCUMENTS

| | | | | |
|---|---|---|---|---|
| 4,620,068 | A * | 10/1986 | Wieder | H04R 1/083 181/129 |
| 2007/0003093 | A1* | 1/2007 | Ito | H04R 5/0335 381/378 |
| 2007/0053539 | A1* | 3/2007 | Tsunoda | H04R 1/1066 381/377 |
| 2008/0226102 | A1* | 9/2008 | Wang | H04R 1/1058 381/309 |
| 2011/0051960 | A1* | 3/2011 | Robuchon | H04R 1/1066 381/151 |

* cited by examiner

*Primary Examiner* — Tuan D Nguyen

(57) ABSTRACT

An audio headset includes a pair of earphones and a nape-band. The earphones are secured to the nape-band at respective ends of the nape-band. A suspension element extends between (i) a first end connected to the headset at a first location in front of a user's first ear when the user is wearing the headset, and (ii) a second end connected to the headset at a second location in front of the user's second ear when the user is wearing the headset. As such, each suspension element at least partially wraps around a portion of a top of a respective ear of the user to support the headset when the headset is being worn by the user.

12 Claims, 8 Drawing Sheets

AUDIO HEADSET

PRIORITY CLAIM

This is a divisional application of U.S. patent application Ser. No. 14/014,929, filed Aug. 30, 2013, the entire contents of which are incorporated by reference.

BACKGROUND

This disclosure relates to a nape-band type of audio headset. A typical nape-band headset includes a pair of earphones which are connected to respective ends of a metal, composite and/or plastic nape-band. When the headset is worn by a user, each earphone is located adjacent a respective ear of the user and the nape-band is located adjacent to a nape of the neck of the user. Usually the nape-band rests on top of the ears of the user. The nape-band joins the two earphones, provides a clamping force to press the earphones towards the user's ears, and provides a path between the earphones for electrical conductors.

The plastic nape-band cannot conform to the shape of the top of a user's ears and so can become uncomfortable after being worn for a period of time (similar to how eyeglasses can start to become uncomfortable). In addition, if the user is exercising while wearing the headset (e.g. jogging), the nape-band can bounce up and down, effectively rotating about an axis that passes through the user's ears. The bouncing nape-band can be annoying and uncomfortable.

U.S. Pat. No. 5,457,751 discloses a headset framework apparatus designed to be worn around the back of the head, and supported, in part, by the ears of the user, and, in part, by the nape, or back of, the user's neck. The framework and support means of the apparatus, is preferably, substantially U-shaped, and may be further shaped, such that it generally conforms to the user's neck and head. At least one integral, or detachable, speaker means is provided, which extends from the framework and support means, proximate to the ear of the user. A microphone may also be provided, if desired. Visual display means attached to the framework are also provided. Also, electronic component means, may be integral with, or removably attachable to, the nape supported member of the framework and support means, or may be located at other than the site of the headset framework apparatus, and operatively connected thereto.

SUMMARY

All examples and features mentioned below can be combined in any technically possible way.

In one aspect, an audio headset includes a pair of earphones and a nape-band. The earphones are secured to the nape-band at respective ends of the nape-band. A pair of suspension elements each have (i) a first end connected to the headset at a location in front of a user's respective ear when the user is wearing the headset, and (ii) a second end connected to the headset at a location behind the user's respective ear when the user is wearing the headset. As such, each suspension element at least partially wraps around a portion of a top of a respective ear of the user to support the headset when the headset is being worn by the user.

Embodiments may include one of the following features, or any combination thereof. Each suspension element has a cross-section in the shape of a hollow tube. Each suspension element has a length in the range of about 20 mm to about 50 mm. Each suspension element has a length in the range of about 50 mm to about 150 mm. Each suspension element is elastomeric and includes silicone which has a Shore A durometer of from about 4 to about 50. The first and second ends of each suspension element are connected to the nape-band. Each suspension element contacts a portion of a user's head when the headset is being worn by the user. The nape-band does not contact a top of the user's ears when the headset is being worn by the user. The headset further includes a pair of stability elements. Each stability element has (i) a first end connected to the headset at a location behind the user's respective ear when the user is wearing the headset, and (ii) a second end connected to the headset at a location further behind the user's respective ear than where the first end of the stability element is connected when the headset is worn. Each stability element engages a portion of a head of the user to stabilize the headset when worn.

In another aspect, an audio headset includes a pair of earphones and a nape-band. The earphones are secured to the nape-band at respective ends of the nape-band. A suspension element has (i) a first end connected to the headset at a location in front of a user's first ear when the user is wearing the headset, and (ii) a second end connected to the headset at a location in front of a user's second ear when the user is wearing the headset. The suspension element at least partially wraps around a portion of a top of both ears of the user to support the headset when the headset is being worn by the user.

Embodiments may include one of the above and/or below features, or any combination thereof. The suspension element is connected to the nape-band at at least one location behind the user's ears when the headset is being worn by the user. The suspension element contacts a portion of a user's head when the headset is being worn by the user. The nape-band does not contact the user's ears when the headset is being worn by the user.

In another aspect, a pair of eyeglasses includes a frame and a pair of lenses that are each secured to the frame, and a pair of arms that each have a first end connected to the frame. A portion of each arm located towards a second end of the arm is arranged to be located adjacent to a respective ear of a user of the eyeglasses when the user is wearing the eyeglasses. A pair of suspension elements each have (i) a first end connected to a respective arm at a location in front of a user's respective ear when the user is wearing the eyeglasses, and (ii) a second end connected to the respective arm at a location behind the user's respective ear when the user is wearing the eyeglasses. Each suspension element at least partially wraps around a portion of a top of a respective ear of the user to support a respective arm when the eyeglasses are being worn by the user.

Embodiments may include one of the above and/or below features, or any combination thereof. Each suspension element contacts a portion of a user's head when the eyeglasses are being worn by the user. The arms do not contact a top of the user's ears when the eyeglasses are being worn by the user. The arms contact one of the head or ears of the user for lateral locating purposes while relying on the suspension elements to suspend the glasses on top of the ears. Each suspension element is in tension when the eyeglasses are being worn by the user.

In another aspect, an audio headset includes a pair of earphones and a nape-band. The earphones are secured to the nape-band at respective ends of the nape-band. A pair of stability elements each have (i) a first end connected to the headset at a location behind the user's respective ear when the user is wearing the headset, and (ii) a second end connected to the headset at a location further behind the user's respective ear than where the first end of the stability element is connected when the headset is worn. Each stability element engages a portion of a head of the user to stabilize the headset when worn.

Embodiments may include one of the above and/or below features, or any combination thereof. Each stability element has a cross-section in the shape of a hollow tube. Each stability element is elastomeric and includes silicone which has a Shore A durometer of from about 4 to about 50. The first and second ends of each stability element are connected to the nape-band.

DETAILED DESCRIPTION

The description below describes an audio headset and a pair of eye glasses that each includes at least one suspension element. The suspension element(s) at least partially wraps around a portion of a top of the ears of a user to support the headset when the headset is being worn by the user. The suspension element stretches (if it is elastomeric) and bends to conform around the user's ears to increase the area where the vertical load of the headset (or eyeglasses) is distributed. The increased load distribution area reduces pressure and hot spots on the ears that would regularly be created by a less flexible piece (e.g. plastic arms of eyeglasses resting on the ears) yielding substantially improved comfort.

"Earphone" as used herein refers to a device that fits around, on, or in an ear and which may radiate acoustic energy into the ear canal. An earphone may include an acoustic driver to transduce audio signals to acoustic energy. Electrical leads can conduct audio signals to an acoustic driver in the earphone. An earphone may be one of a pair of earphones, one for each ear. An earphone may be connected mechanically to another earphone, for example, by a metal, composite and/or plastic nape-band. An earphone may include components for wirelessly receiving audio signals, and may include components of an active noise reduction (ANR) system. In addition, an earphone may include features which provide passive hearing protection. A pair of earphones may be part of a headset that has stereo Bluetooth® wireless capabilities.

Figure 1:
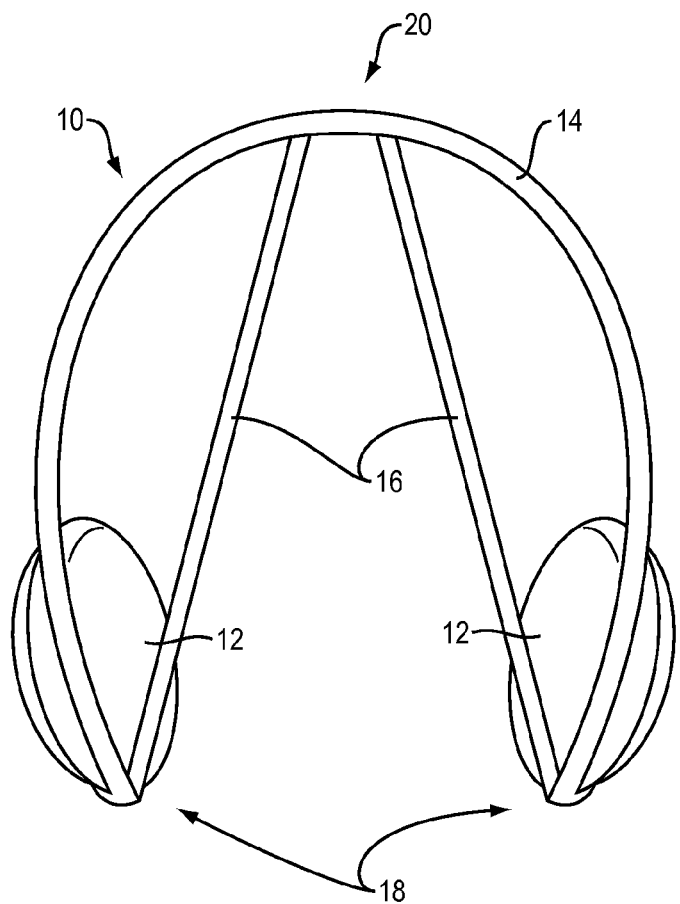
FIG. 1 is top view of a nape-band headset.
Figure 2:
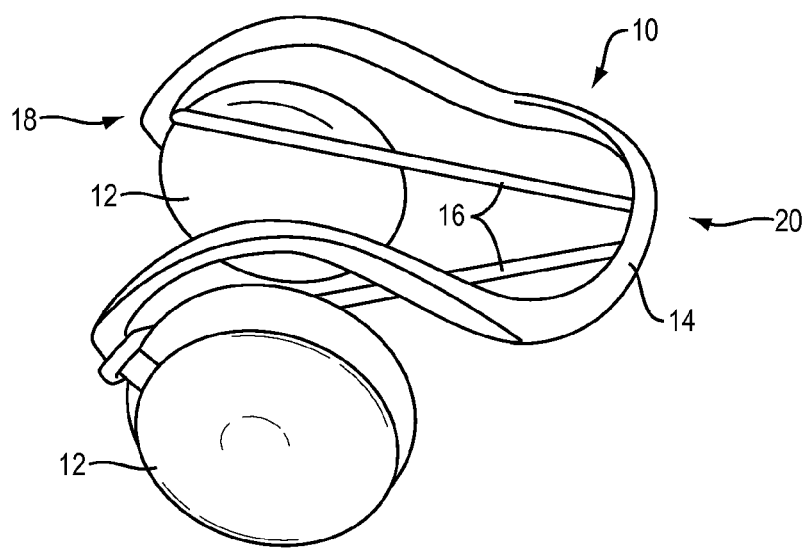
FIG. 2 is a perspective view of the headset of FIG. 1 as seen from the side and top.

Referring to FIGS. 1 and 2, an audio headset 10 includes a pair of earphones 12 which are secured to a nape-band 14 at (i.e. near) respective ends of the nape-band. When the headset 10 is worn by a user a back portion of the nape-band is located adjacent to or rests on the nape of the user's neck. A pair of elastomeric suspension elements 16 each have a first end connected to the headset 10 at a location 18 in front of a user's respective ear (see FIG. 3 below) when the user is wearing the headset. In this example the first ends of the suspension elements are connected to the nape-band 14 at or near respective ends of the nape-band. Alternatively, the first ends of the suspension elements can be connected to the earphones 12 in front of the user's ears.

A second end of each suspension element 16 is connected to the headset 10 at a location 20 behind the user's respective ear (see FIG. 4 below) when the user is wearing the headset. In this example the second end of each of the suspension elements 16 is connected to a back portion of the nape-band. However, the second end of each of the suspension elements 16 can be connected to respective portions of the nape-band that are located closer to the respective earphones 12. As such, each suspension element 16 at least partially wraps around a portion of a top of a respective ear of the user to support the headset 10 when the headset is being worn by the user (see FIG. 3).

Each of the suspension elements 16 preferably has a cross-section in the shape of a hollow tube with an outside diameter of from about 3 mm to about 5 mm, and an inside diameter of from about 1 mm to about 3 mm. More preferably the hollow tube has an outside diameter of about 4 mm and an inside diameter of about 2 mm. Each suspension element 16 preferably has a stiffness measured at about the mid-point of the element in the range from about 0.01 N/mm to about 0.015 N/mm Alternatively, each suspension element can be circular and solid in cross-section. Suspension elements with alternative cross-sections (e.g. a semi-circle) can also be used. Each suspension element 16 in this example preferably has a length in the range of about 130 mm to about 150 mm, and more preferably has a length of about 140 mm. In an alternative example (e.g. FIG. 8) the suspension elements can each have a length in the range of about 20-30 mm. Overall, the suspension elements can each have a length in the range of about 20-150 mm. Each suspension element preferably includes silicone which has a Shore A durometer of from about 4 to about 50, and more preferably has a Shore A durometer of about 5.

Figure 3:
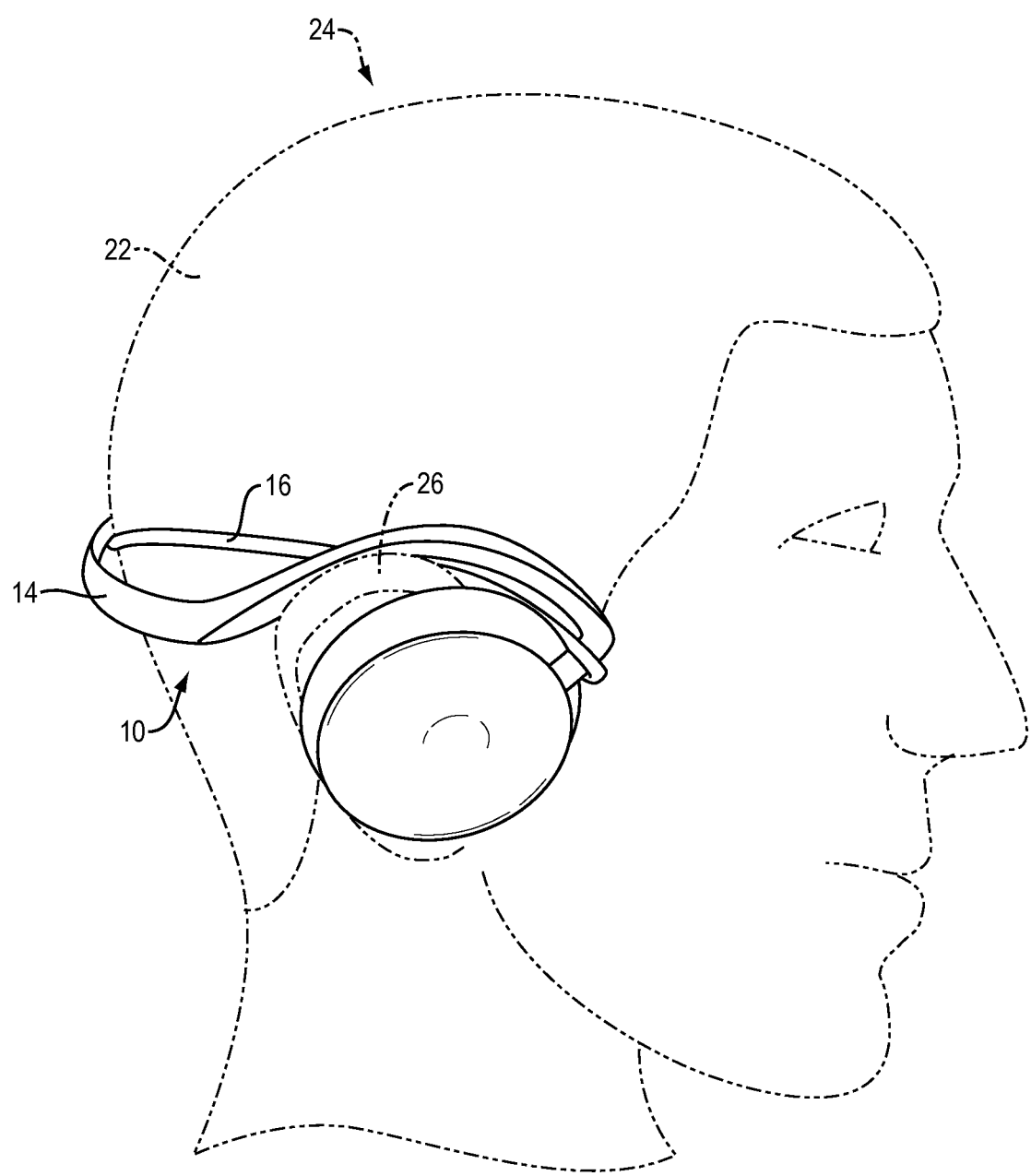
FIG. 3 is a side view of the headset of FIG. 1 being worn by a user.
Figure 4:
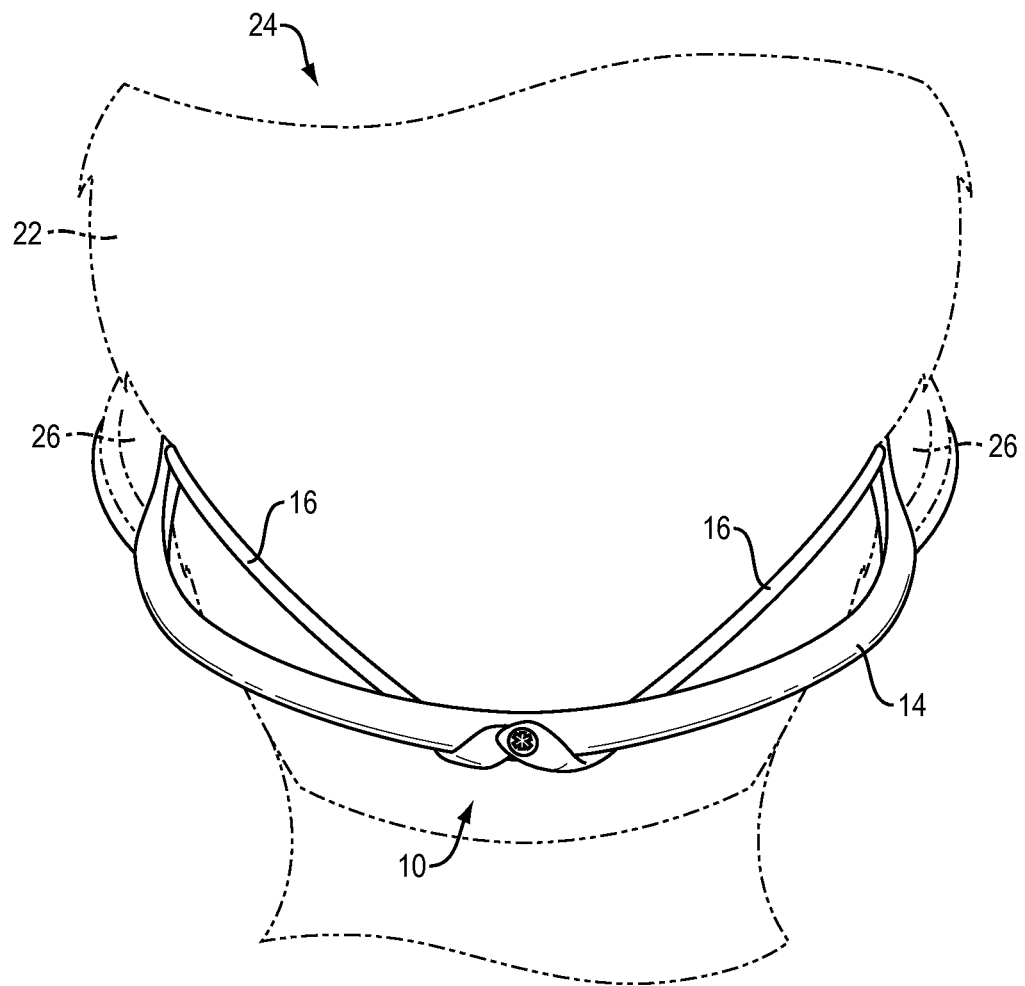
FIG. 4 is a rear view of the headset of FIG. 1 being worn by a user.

With reference to FIGS. 3 and 4, the headset 10 is shown being worn on a head 22 of a user 24. Each suspension element 16 contacts a portion of the user's head 22 when the headset 10 is being worn. The nape-band 14 does not contact the top of the user's ears 26 when worn (although the nape-band may contact the inside of the ears, or the head on certain users). The phrase "top of the user's ears" means that portion of the ear on which eyeglass arms would typically rest. The suspension elements 16 can be connected to the headset 10 in a number of ways such as by insert molding, hooks, clamps or using an adhesive.

Figure 5:
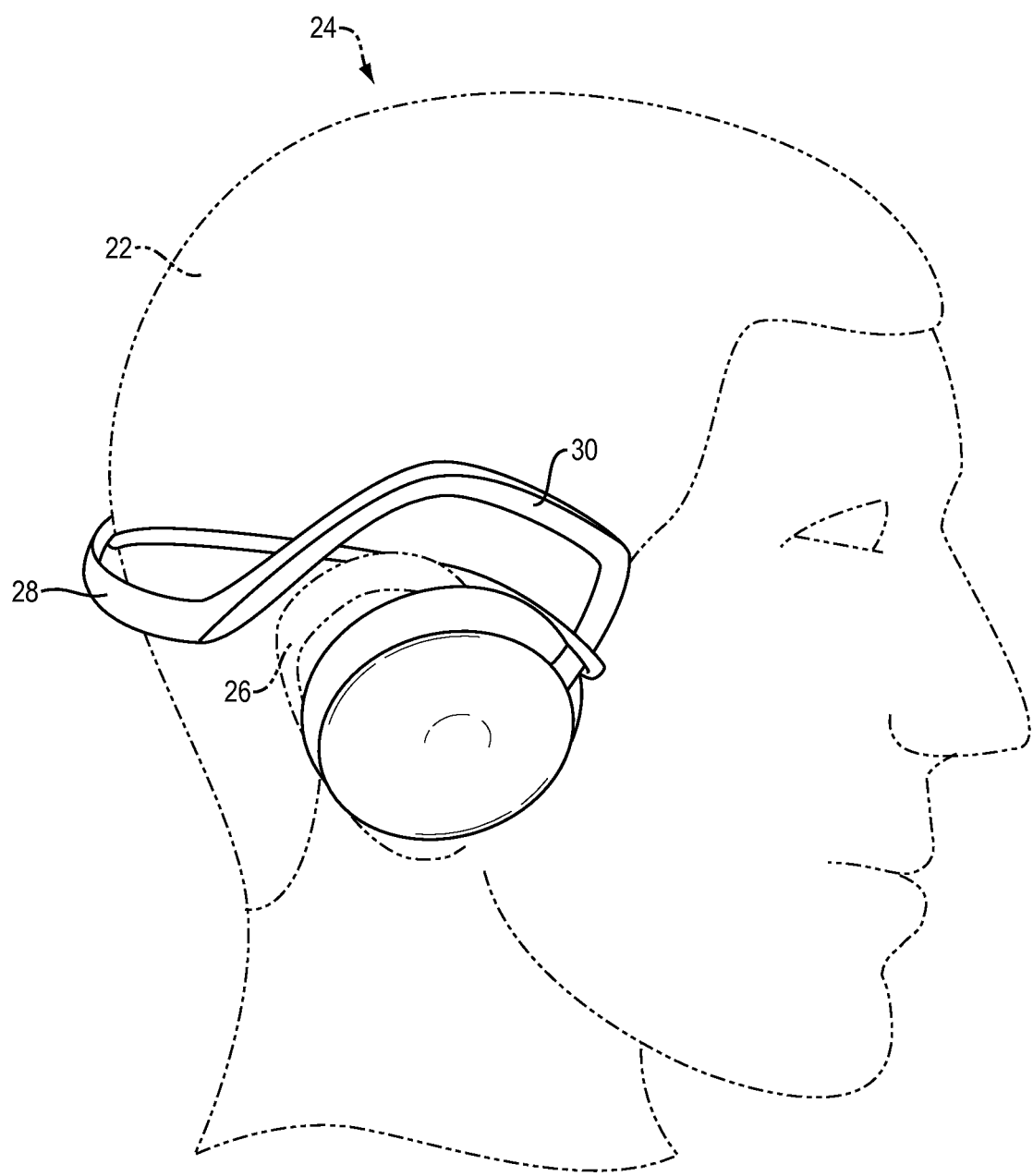
FIG. 5 shows a headset with an alternative type of nape-band.

Turning to FIG. 5, an alternate nape-band 28 is shown. In this example, a portion 30 of the nape-band 28 adjacent to the ear 26 is located above the ear. The portion 30 is also located a minimal distance from the head 22 so that the nape-band 28 (including the portion 30) is not touching the ear 26 or the head.

Figure 6:
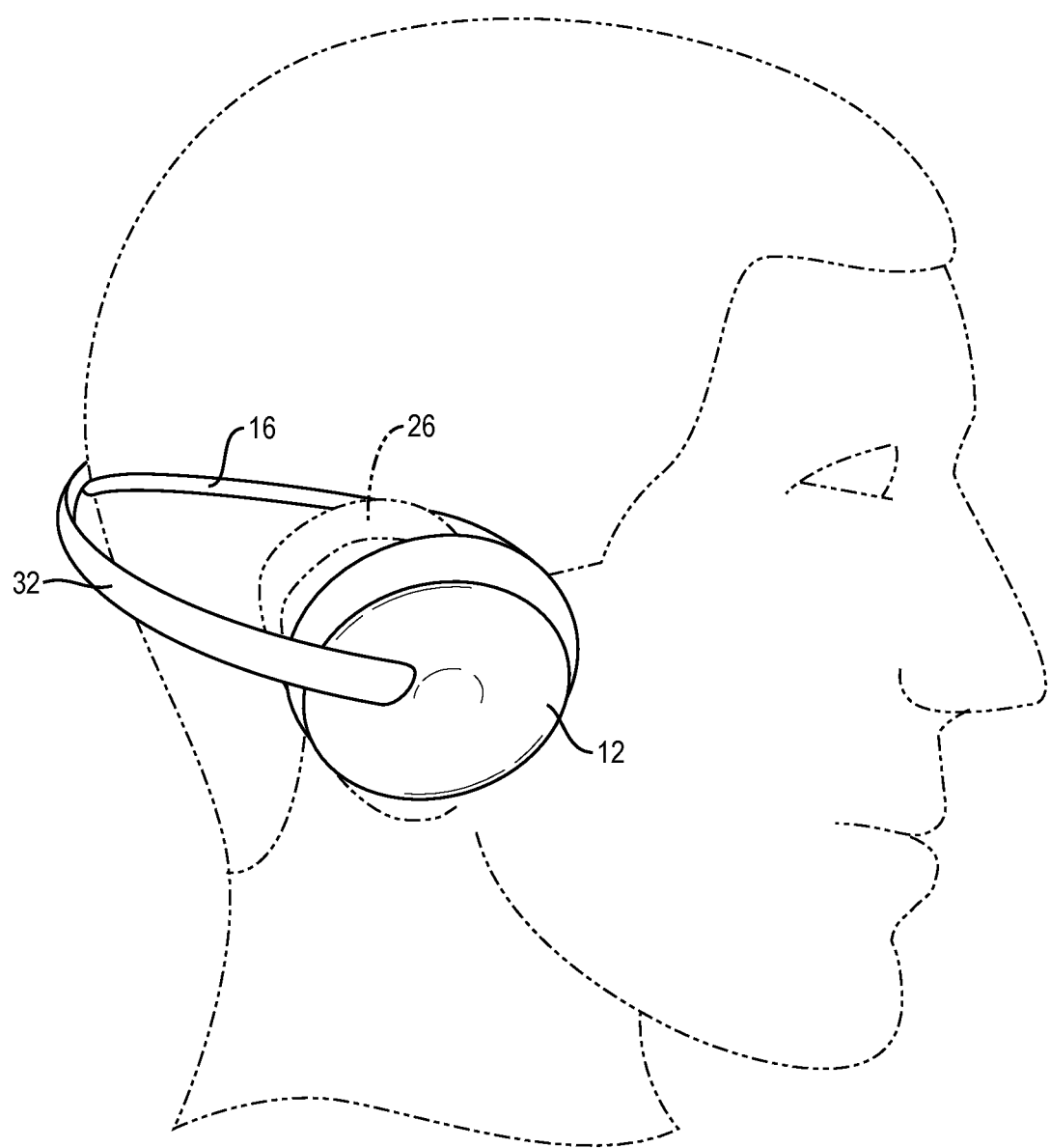
FIG. 6 shows a headset with a still further alternative type of nape-band.

Referring to FIG. 6, another alternate nape-band 32 is shown. In this example the nape-band 32 extends around a side of the ear 26 to connect to the earphone 12. In this example the end of the suspension element 16 is connected to the earphone 12 instead of to the nape-band 32. Note that the suspension element 16 is the only portion of the headset that passes adjacent to a top portion of the ear 26. In all of the examples described herein, the suspension elements preferably bend and conform to the shape of a top portion of the ear, and are preferably in tension when being worn by a user.

Figure 7:
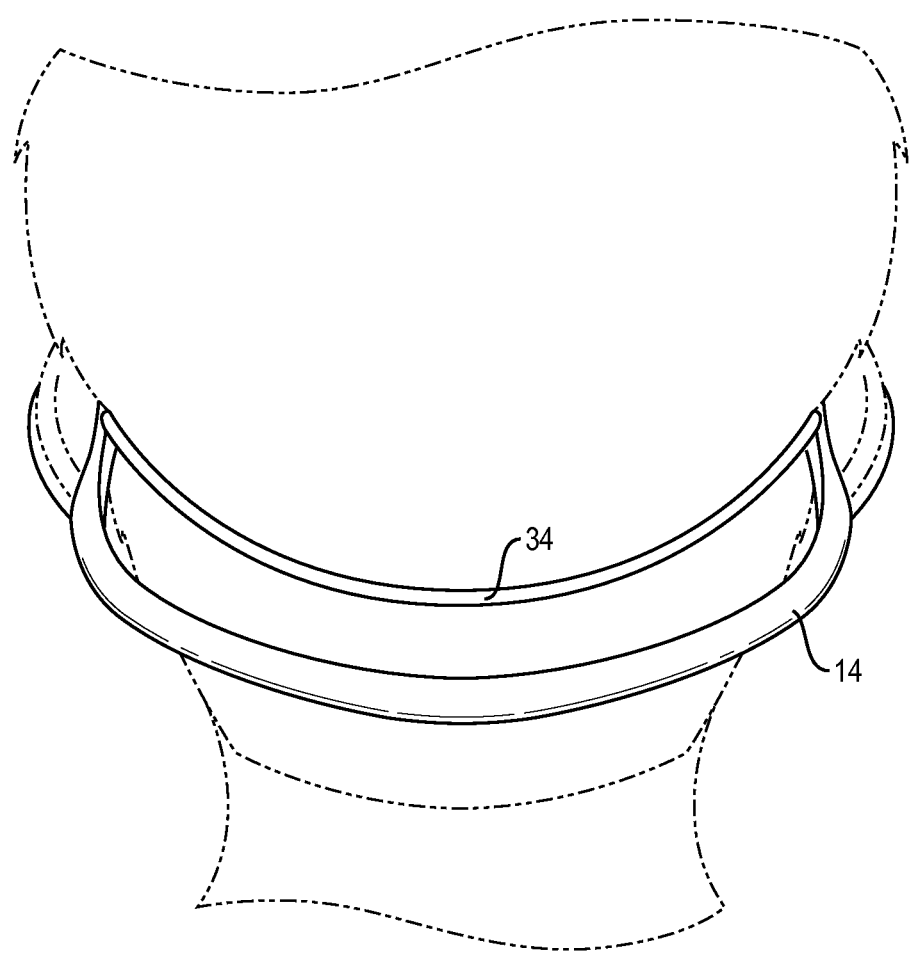
FIG. 7 shows a headset with an alternative type of suspension element.

With reference to FIG. 7, a headset is shown which is substantially the same as the headset of FIGS. 1-4 except that in FIG. 7 there is a single elastomeric suspension element 34 instead of two suspension elements. Note that in this example the suspension element 34 is not connected to the back portion of the nape-band 14. A first end of suspension element 34 is connected to the headset at a location in front of a user's first ear when the user is wearing the headset. A second end of the suspension element 34 is connected to the headset at a location in front of a user's second ear when the user is wearing the headset. The suspension element 34 at least partially wraps around a portion of a top of both ears of the user to support the headset when the headset is being worn by the user. In an alternate example, the suspension element 34 can be connected to the back portion of the nape-band 14 (behind the user's ears when the headset is being worn by the user).

Figure 8:
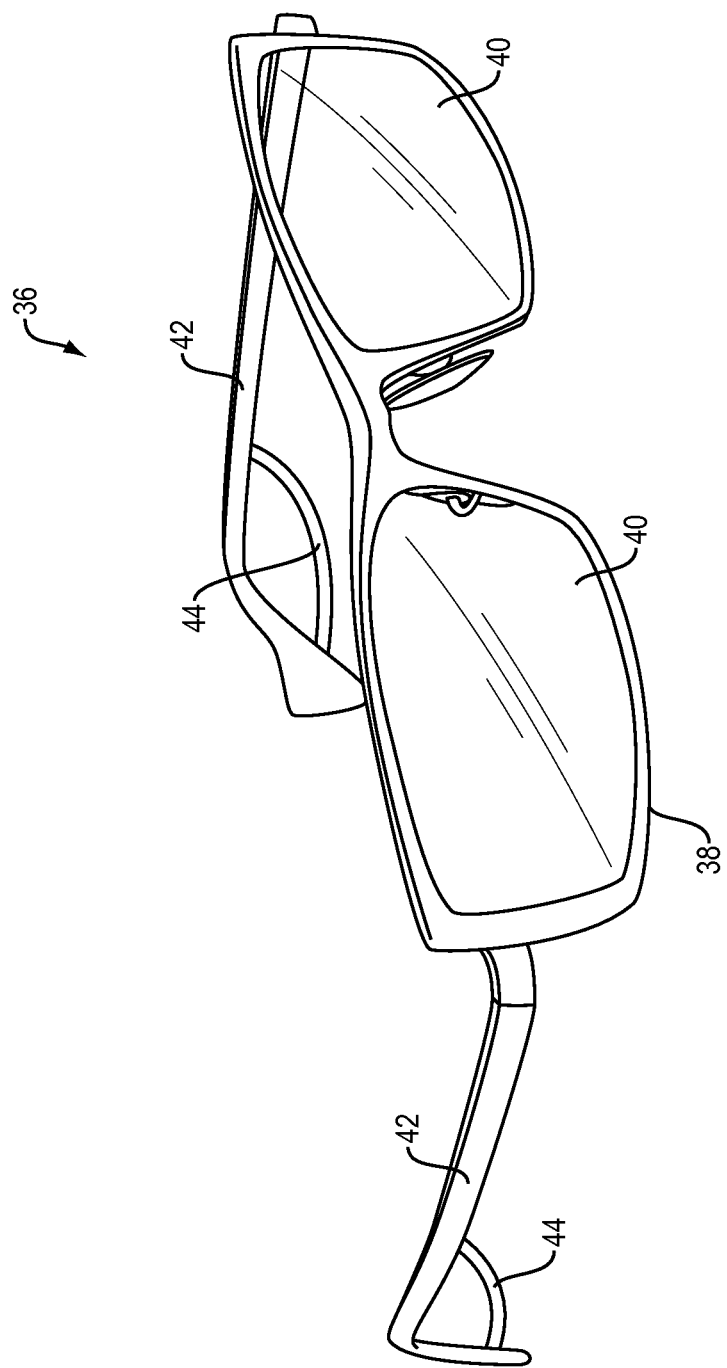
FIG. 8 is a perspective view of a pair of eyeglasses with two suspension elements.

FIG. 8 shows a pair of eyeglasses 36 with a frame 38 and a pair of lenses 40 that are each secured to the frame. A pair of arms 42 each has a first end connected to the frame. A portion of each arm located towards a second end of the arm is arranged to be located adjacent to a respective ear of a user of the eyeglasses 36 when the user is wearing the eyeglasses. A pair of suspension elements 44 each have (i) a first end connected to a respective arm at a location in front of a user's respective ear when the user is wearing the eyeglasses, and (ii) a second end connected to the respective arm at a location behind the user's respective ear when the user is wearing the eyeglasses. As such, each suspension element 44 at least partially wraps around a portion of a top of a respective ear of the user to support a respective arm when the eyeglasses are being worn by the user.

The suspension elements in FIG. 8 are substantially non-elastomeric and can be in the form of a soft flat or round shoe lace. Slack is provided in the suspension elements 44 so that they can conform to and wrap around the top of the ears. Of course elastomeric suspension elements can be used with the eyeglasses 36, and substantially non-elastomeric suspension elements can be used with the headsets described above. In this example the arms 42 do not contact the tops of the user's ears when the eyeglasses are being worn by the user. The arms 42 may contact the user's head or inside of the pinna of the ears for lateral locating purposes while relying on the suspension elements to suspend the glasses on top of the ears.

Figure 9:
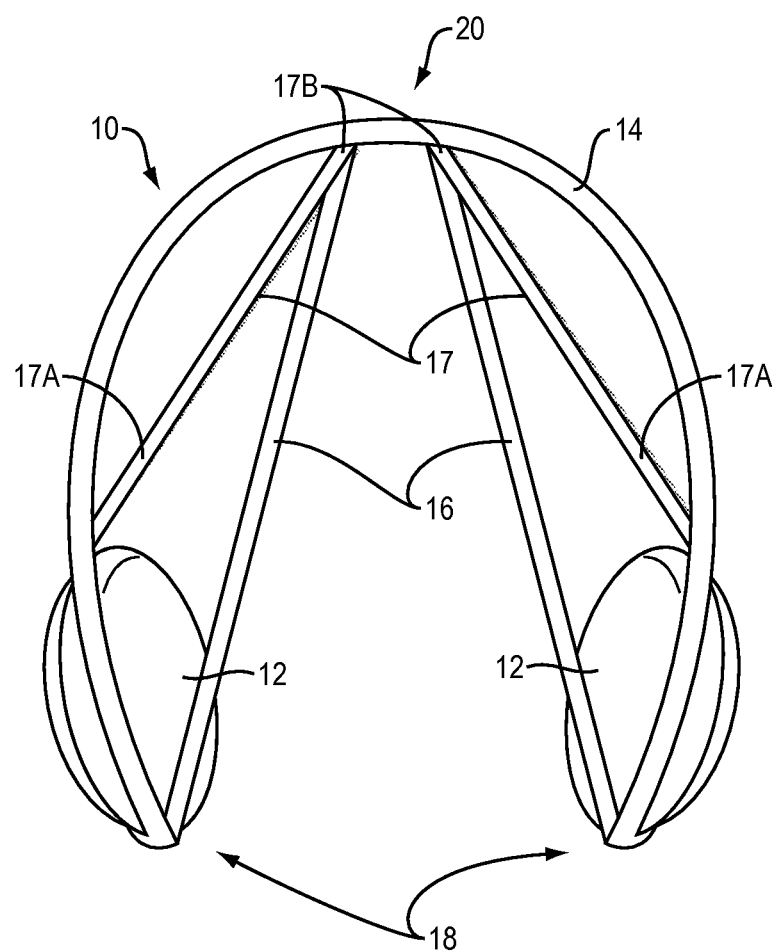
FIG. 9 is a headset with an additional pair of suspension elements.

FIG. 9 shows a nape-band headset that is similar to the headset shown in FIG. 1 with the addition of a pair of stability elements 17. Each stability element 17 has (i) a first end 17A connected to the headset 10 at a location behind the user's respective ear when the user is wearing the headset, and (ii) a second end 17B connected to the headset at a location further behind the user's respective ear than where the first end 17A of the stability element is connected when the user is wearing the headset. The stability elements 17 can have some or all of the same characteristics (described above) as the suspension elements 16. Each stability element 17 engages a portion of a head of the user to stabilize the headset when worn. The stability elements 17 can be used with any of the headsets describe above. In addition, the stability elements 17 can be used on a headset that does not include the suspension elements 16. Instead of using two stability elements, a single stability element can be used which may or may not be connected to the back of the nape-band (similar to what is shown in FIG. 7 for the single suspension element).

A number of implementations have been described. Nevertheless, it will be understood that additional modifications may be made without departing from the scope of the inventive concepts described herein, and, accordingly, other embodiments are within the scope of the following claims.

What is claimed is:

1. An audio headset, comprising:
   a pair of earphones;
   a nape-band, the earphones being secured to the nape-band at respective ends of the nape-band; and
   a suspension element having (i) a first end connected to the headset at a first location in front of a user's first ear when the user is wearing the headset, and (ii) a second end connected to the headset at a second location in front of a user's second ear when the user is wearing the headset,
   the suspension element extending between the respective first and second locations,
   whereby the suspension element at least partially wraps around a portion of a top of both ears of the user to support the headset when the headset is being worn by the user.

2. The headset of claim 1, wherein the suspension element has a cross-section in the shape of a hollow tube.

3. The headset of claim 1, wherein the suspension element is connected to the nape-band at at least a third location behind the user's ears when the headset is being worn by the user.

4. The headset of claim 1, wherein the suspension element is elastomeric and includes silicone which has a Shore A durometer of from about 4 to about 50.

5. The headset of claim 1, wherein the first and second ends of the suspension element are connected to the nape-band.

6. The headset of claim 1, wherein the suspension element contacts a portion of a user's head when the headset is being worn by the user.

7. The headset of claim 1, wherein the nape-band does not contact the user's ears when the headset is being worn by the user.

8. The headset of claim 1, further including a pair of stability elements, each stability element having (i) a first end connected to the headset at a third location behind the user's respective ear when the user is wearing the headset, and (ii) a second end connected to the headset at a fourth location further behind the user's respective ear than where the first end of the stability element is connected when the headset is worn,
   each stability element extending between the respective third and fourth locations,
   whereby each stability element engages a portion of a head of the user to stabilize the headset when worn.

9. An audio headset, comprising:
   a pair of earphones;
   a nape-band, the earphones being secured to the nape-band at respective ends of the nape-band; and
   a pair of stability elements, each stability element having (i) a first end connected to the headset at a first location behind the user's respective ear when the user is wearing the headset, and (ii) a second end connected to the headset at a second location further behind the user's respective ear than where the first end of the stability element is connected when the headset is worn,
   each stability element extending between the respective first and second locations,
   whereby each stability element engages a portion of a head of the user to stabilize the headset when worn.

10. The headset of claim 9, wherein each stability element has a cross-section in the shape of a hollow tube.

11. The headset of claim 9, wherein each stability element is elastomeric and includes silicone which has a Shore A durometer of from about 4 to about 50.

12. The headset of claim 9, wherein the first and second ends of each stability element are connected to the nape-band.

\* \* \* \* \*